United States Patent
Wei et al.

(10) Patent No.: US 9,104,212 B2
(45) Date of Patent: Aug. 11, 2015

(54) POWER SUPPLY APPARATUS AND METHOD, AND USER EQUIPMENT

(71) Applicant: Huawei Device Co., Ltd., Shenzhen, Guangdong (CN)

(72) Inventors: Konggang Wei, Shenzhen (CN); Qiang Xiong, Shenzhen (CN); Yuanguo Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 434 days.

(21) Appl. No.: 13/722,204

(22) Filed: Dec. 20, 2012

(65) Prior Publication Data
US 2014/0043007 A1  Feb. 13, 2014

Related U.S. Application Data

(63) Continuation of application No. PCT/CN2012/079777, filed on Aug. 7, 2012.

(51) Int. Cl.
| | |
|---|---|
| H02J 7/00 | (2006.01) |
| H02J 7/04 | (2006.01) |
| G05F 1/00 | (2006.01) |
| G05F 5/00 | (2006.01) |
| G06F 1/28 | (2006.01) |

(Continued)

(52) U.S. Cl.
CPC .. *G05F 5/00* (2013.01); *G06F 1/28* (2013.01); *H01M 10/425* (2013.01); *H01M 10/48* (2013.01); *H02J 7/0031* (2013.01); *H02J 2007/0098* (2013.01)

(58) Field of Classification Search
CPC .............. H02J 7/0031; H02J 2007/004; H02J 2007/0037; Y02E 60/12; H01M 10/48
USPC ........... 320/134, 137, 140; 323/222, 269, 282
See application file for complete search history.

(56) References Cited

U.S. PATENT DOCUMENTS

| 5,867,007 A | 2/1999 | Kim |
| 2005/0242779 A1* | 11/2005 | Yoshio ........................ 320/134 |

(Continued)

FOREIGN PATENT DOCUMENTS

| CN | 1819003 A | 8/2006 |
| CN | 101252313 A | 8/2008 |

(Continued)

OTHER PUBLICATIONS

Wu et al, "Control Strategy for DC/DC Multiple Modules Series-Parallel Combined Systems," Transactions of China Electrotechnical Society, vol. 24, No. 7, pp. 93-102, Beijing, China (Jul. 2009).

(Continued)

*Primary Examiner* — Richard Isla Rodas
*Assistant Examiner* — Mohammed Jameel Sharief
(74) *Attorney, Agent, or Firm* — Leydig, Voit & Mayer, Ltd.

(57) ABSTRACT

Embodiments of the present invention provide a power supply apparatus and method, and a user equipment. In the embodiments of the present invention, charging protection for the battery electric core and a bypass function for the voltage boost circuit can be implemented through control that is performed on the switch device by the logic control circuit, so that additional impedance can be reduced and working efficiency can be improved.

16 Claims, 5 Drawing Sheets

(51) Int. Cl.
*H01M 10/42* (2006.01)
*H01M 10/48* (2006.01)

(56) References Cited

U.S. PATENT DOCUMENTS

| | | | |
|---|---|---|---|
| 2010/0156175 | A1 | 6/2010 | Wei |
| 2011/0121653 | A1 | 5/2011 | Hartular et al. |
| 2011/0140670 | A1 | 6/2011 | Maetani |
| 2011/0156655 | A1 | 6/2011 | Kim |
| 2011/0313613 | A1* | 12/2011 | Kawahara et al. .............. 701/29 |

FOREIGN PATENT DOCUMENTS

| | | |
|---|---|---|
| CN | 101281343 A | 10/2008 |
| CN | 102110864 A | 6/2011 |
| CN | 102255362 A | 11/2011 |
| EP | 2159899 A2 | 3/2010 |
| EP | 2194600 A1 | 6/2010 |
| JP | 8264166 A | 10/1996 |
| JP | 8294236 A | 11/1996 |
| JP | 1098835 A | 4/1998 |
| JP | 2006238629 A | 9/2006 |
| JP | 2009174975 A | 8/2009 |
| JP | 2010136533 A | 6/2010 |
| JP | 2011223755 A | 11/2011 |

OTHER PUBLICATIONS

Deng et al., "Software Design of FCEV Battery Management System and Prediction of SOC," Instrumentation Technology, pp. 12-15, Beijing, China (Dec. 2010).

* cited by examiner

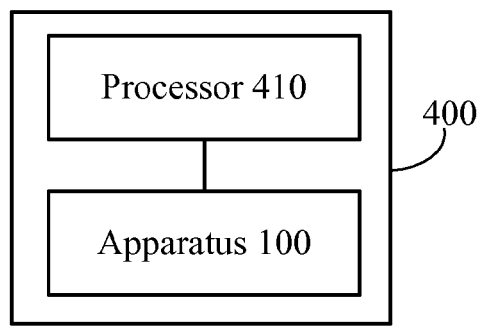

FIG. 4

```
┌─────────────────────────────────────────────────────────────┐
│ A state detection circuit detects a state of a battery     │
│ electric core and a state of a power supply apparatus, and │  510
│ generates a state signal, where the state signal is used   │
│ to indicate the state of the battery electric core and     │
│ the state of the apparatus                                 │
└─────────────────────────────────────────────────────────────┘
                              │
                              ▼
┌─────────────────────────────────────────────────────────────┐
│ A logic control circuit receives the state signal from the │
│ state detection circuit, and controls a switch device and  │
│ a voltage boost circuit according to the state signal,     │
│ when the battery electric core is in an abnormal charging  │  520
│ state, controls the switch device to turn off a current    │
│ path of the battery electric core, and when the voltage    │
│ boost circuit is not required to work, controls the switch │
│ device to turn on the current path                         │
└─────────────────────────────────────────────────────────────┘
```

POWER SUPPLY APPARATUS AND METHOD, AND USER EQUIPMENT

CROSS-REFERENCE TO RELATED APPLICATIONS

This application is a continuation of International Patent Application No. PCT/CN2012/079777, filed on Aug. 7, 2012, which is hereby incorporated by reference in their entireties.

FIELD OF THE INVENTION

The present invention relates to the field of electronics, and in particular, to a power supply apparatus and method, and a user equipment.

BACKGROUND OF THE INVENTION

In the design of mobile communication terminals in the prior art, shutdown voltages of batteries are mostly set to a value ranging from 3.3 V to 3.5 V. However, with the progress of a battery technology and application of a new material, a working voltage of a battery can be lower. In this way, more residual electricity exists in a low voltage range.

In order to fully utilize the capacity of a battery in a low voltage range, generally, voltage boost needs to be performed when the battery is at a low voltage, so as to ensure normal work of devices in a circuit. At present, multiple switch devices, for example, metal-oxide-semiconductor field-effect transistors (Metal-Oxide-Semiconductor Field-Effect Transistors, MOSFETs), are generally required in a common voltage boost circuit to implement voltage boost and a bypass mode when the voltage boost is not required. Because a switch device has direct current impedance, large impedance is introduced into a working path, thereby reducing overall working efficiency of a system and deteriorating a loading capability of a battery.

SUMMARY OF THE INVENTION

Embodiments of the present invention provide a power supply apparatus and method, and a user equipment, so that additional impedance can be reduced and working efficiency can be improved.

In a first aspect, a power supply apparatus is provided and includes: a battery electric core, a switch device, a voltage boost circuit, a state detection circuit, and a logic control circuit, where the switch device is connected to a current path of the battery electric core; the voltage boost circuit is connected in parallel to the current path, and is configured to boost an output voltage of the battery electric core; the state detection circuit is configured to detect a state of the battery electric core and a state of the apparatus, and generate a state signal, where the state signal is used to indicate the state of the battery electric core and the state of the apparatus; and the logic control circuit is configured to receive the state signal from the state detection circuit, and control the switch device and the voltage boost circuit according to the state signal, when the battery electric core is in an abnormal charging state, control the switch device to turn off the current path, and when the voltage boost circuit is not required to work, control the switch device to turn on the current path.

In combination with the first aspect, in a first possible implementation manner, the logic control circuit is specifically configured to, when the state signal indicates that the battery electric core is in an over-voltage state or when the state signal indicates that the battery electric core is in an over-current charging state, turn off the voltage boost circuit and control the switch device to turn off the current path.

In combination with the first aspect, in a second possible implementation manner, the logic control circuit is specifically configured to, when the state signal indicates that the output voltage of the battery electric core is smaller than a voltage threshold and indicates that an output voltage of the apparatus is smaller than the voltage threshold, turn on the voltage boost circuit and control the switch device to turn off the current path.

In combination with the first aspect, in a third possible implementation manner, the logic control circuit is specifically configured to, when the state signal indicates that the output voltage of the battery electric core is greater than or equal to a voltage threshold and indicates that an output voltage of the apparatus is greater than or equal to the voltage threshold, turn off the voltage boost circuit and control the switch device to turn on the current path.

In combination with the first aspect, or the first possible implementation manner of the first aspect, or the second possible implementation manner of the first aspect, or the third possible implementation manner of the first aspect, in a fourth possible implementation manner, the apparatus further includes: a driving circuit, which is connected to the switch device, where the driving circuit adopts a field-effect transistor push-pull structure; and the logic control circuit is specifically configured to control the switch device through the driving circuit.

In combination with the first aspect, or the first possible implementation manner of the first aspect, or the second possible implementation manner of the first aspect, or the third possible implementation manner of the first aspect, or the fourth possible implementation manner of the first aspect, in a fifth possible implementation manner, the apparatus further includes an isolation charging circuit, which is connected in parallel to the current path and the voltage boost circuit, and configured to charge the battery electric core and isolate the output voltage of the battery electric core from the output voltage of the apparatus; and the logic control circuit is further configured to control the isolation charging circuit according to the state signal.

In combination with the fifth possible implementation manner of the first aspect, in a sixth possible implementation manner, the logic control circuit is specifically configured to, when the state signal indicates that the output voltage of the battery electric core is smaller than a voltage threshold and indicates that the output voltage of the apparatus is greater than or equal to the voltage threshold, turn on the isolation charging circuit, turn off the voltage boost circuit, and control the switch device to turn off the current path.

In combination with the fifth possible implementation manner of the first aspect or the sixth possible implementation manner of the first aspect, in a seventh possible implementation manner, the voltage boost circuit, the state detection circuit, the logic control circuit, and the isolation charging circuit are integrated in one chip.

In combination with the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, in an eighth possible implementation manner, the state detection circuit includes a first voltage detection circuit and a second voltage detection circuit, where the first voltage detection circuit is configured to detect the output voltage of the battery electric core and compare the output voltage of the battery electric core with a voltage threshold; and the second voltage detection circuit is configured to detect the output voltage of the apparatus and compare the output voltage of the apparatus with the voltage threshold.

In a second aspect, a user equipment is provided and includes: a processor and the apparatus described in the first aspect, or in combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, where the apparatus is configured to supply power to the processor.

In a third aspect, a power supply method is provided and includes: detecting, by a state detection circuit, a state of a battery electric core and a state of a power supply apparatus, and generating a state signal, where the state signal is used to indicate the state of the battery electric core and the state of the apparatus; and receiving, by a logic control circuit, the state signal from the state detection circuit, and controlling a switch device and a voltage boost circuit according to the state signal, when the battery electric core is in an abnormal charging state, controlling the switch device to turn off a current path of the battery electric core, and when the voltage boost circuit is not required to work, controlling the switch device to turn on the current path, where the apparatus includes the state detection circuit, the battery electric core, the voltage boost circuit, the switch device, and the logic control circuit, where the switch device is connected in the current path, the voltage boost circuit is connected in parallel to the current path, and the voltage boost circuit is configured to boost an output voltage of the battery electric core.

In combination with the third aspect, in a first possible implementation manner, when the state signal indicates that the battery electric core is in an over-voltage state or when the state signal indicates that the battery electric core is in an over-current charging state, the logic control circuit turns off the voltage boost circuit and controls the switch device to turn off the current path.

In combination with the third aspect, in a second possible implementation manner, when the state signal indicates that the output voltage of the battery electric core is greater than or equal to a voltage threshold and indicates that an output voltage of the apparatus is greater than or equal to the voltage threshold, the logic control circuit turns off the voltage boost circuit and controls the switch device to turn on the current path.

In the embodiments of the present invention, when the battery electric core is in an abnormal charging state, the logic control circuit can control the switch device to turn off the current path, and when the voltage boost circuit is not required to work, the logic control circuit can control the switch device to turn on the current path. Therefore, charging protection for the battery electric core and a bypass function for the voltage boost circuit can be implemented through control that is performed on the switch device by the logic control circuit, without through multiple switch devices. Therefore, the number of switch devices can be reduced, so that additional impedance can be reduced and working efficiency can be improved.

BRIEF DESCRIPTION OF THE DRAWINGS

To illustrate the technical solutions in the embodiments of the present invention more clearly, the accompanying drawings required for describing the embodiments of the present invention are described briefly in the following. Apparently, the accompanying drawings in the following description merely show some embodiments of the present invention, and persons of ordinary skill in the art may also derive other drawings from these accompanying drawings without creative efforts.

FIG. 4 is a schematic block diagram of a user equipment according to an embodiment of the present invention;

FIG. 5 is a schematic flowchart of a power supply method according to an embodiment of the present invention.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
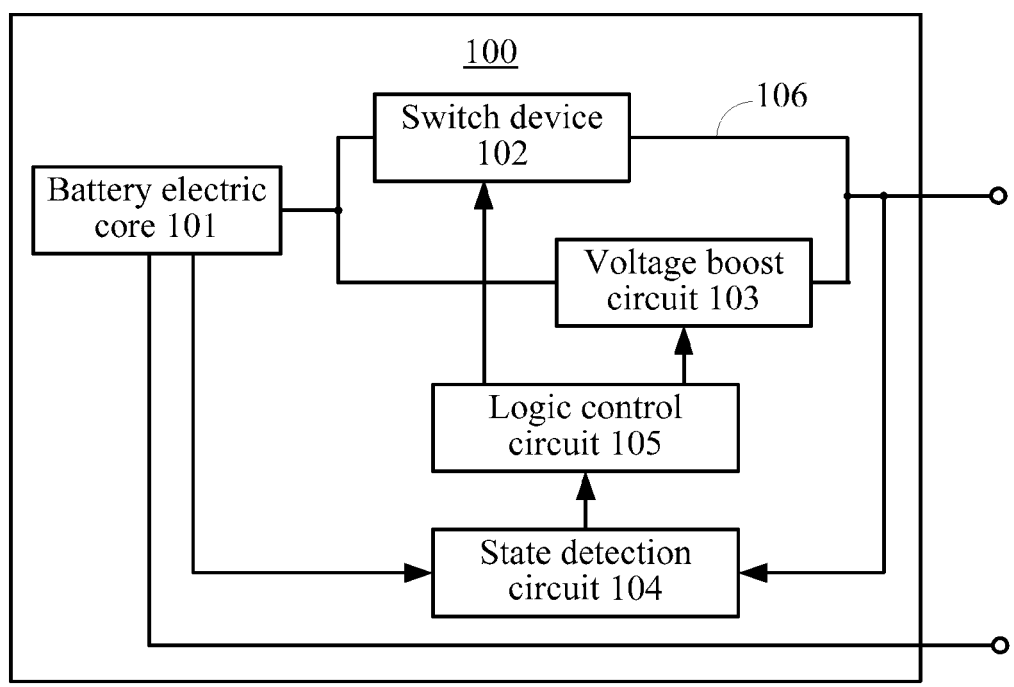
FIG. 1 is a schematic block diagram of a power supply apparatus according to an embodiment of the present invention.

FIG. 1 is a schematic block diagram of a power supply apparatus according to an embodiment of the present invention.

As shown in FIG. 1, an apparatus 100 may include a battery electric core 101, a switch device 102, a voltage boost circuit 103, a state detection circuit 104, and a logic control circuit 105.

The switch device 102 is connected in a current path 106 of the battery electric core 101. The voltage boost circuit 103 is connected in parallel to the current path 106, and is configured to boost an output voltage of the battery electric core 101. The state detection circuit 104 is configured to detect a state of the battery electric core 101 and a state of the apparatus 100, and generate a state signal, where the state signal is used to indicate the state of the battery electric core 101 and the state of the apparatus 100. The logic control circuit 105 is configured to receive the state signal from the state detection circuit 104, and control the switch device 102 and the voltage boost circuit 103 according to the state signal, when the battery electric core 101 is in an abnormal charging state, control the switch device 102 to turn off the current path 106, and when the voltage boost circuit 103 is not required to work, control the switch device 102 to turn on the current path 106.

In this embodiment of the present invention, the logic control circuit 105 controls the switch device 102 and the voltage boost circuit 103 according to the state signal. In one aspect, charging protection for the battery electric core 101 can be implemented. When the battery electric core 101 is in an abnormal charging state, the logic control circuit 105 may control the switch device 102 to turn off the current path 106, so as to perform charging protection on the battery electric core 101. In another aspect, switching between the current path 106 where the switch device 102 is located and the voltage boost circuit 103 can be performed. That is, when the output voltage of the battery electric core 101 needs to be boosted, switching to the voltage boost circuit 103 may be performed, so that an output voltage provided by the apparatus 100 enables a load to work normally; and when the output voltage of the battery electric core 101 does not need to be boosted, the switch device 102 may be controlled to turn on the current path 106.

In the prior art, charging protection for a battery electric core is implemented through one switch device in a charging protection circuit, and a bypass function for a voltage boost circuit is implemented through one switch device in a voltage boost module, and a serial connection relation exists between the charging protection circuit and the voltage boost module, so that impedance generated by a switch device in a discharging loop is large, thereby lowering working efficiency.

It can be seen that, in this embodiment of the present invention, protection control for the battery electric core 101 and a bypass of the voltage boost circuit when voltage boost is not required can be implemented through one switch device, without requiring multiple switch devices. Therefore, the number of switch devices is reduced, so that additional impedance introduced by the switch devices can be reduced and working efficiency can be improved.

In this embodiment of the present invention, when the battery electric core is in an abnormal charging state, the logic control circuit can control the switch device to turn off the current path, and when the voltage boost circuit is not required to work, the logic control circuit can control the switch device to turn on the current path. Therefore, charging protection for the battery electric core and a bypass function for the voltage boost circuit can be implemented through control that is performed on the switch device by the logic control circuit, without through multiple switch devices. Therefore, the number of switch devices can be reduced, so that additional impedance can be reduced and working efficiency can be improved.

In addition, because the number of switch devices can be reduced, space of a printed circuit board (Printed Circuit Board, PCB) can be saved, so that costs of a device and a single board can be lowered.

Optionally, as an embodiment, when the state signal indicates that the battery electric core 101 is in an over-voltage state or when the state signal indicates that the battery electric core 101 is in an over-current charging state, the logic control circuit 105 may turn off the voltage boost circuit 103 and control the switch device 102 to turn off the current path 106. The logic control circuit 105 can implement protection for the battery electric core 101 by turning off the voltage boost circuit 103 and the current path 106.

Optionally, as another embodiment, when the state signal indicates that the output voltage of the battery electric core 101 is smaller than a voltage threshold and indicates that the output voltage of the apparatus 100 is smaller than the voltage threshold, the logic control circuit 105 may turn on the voltage boost circuit 103 and control the switch device 102 to turn off the current path 106.

Optionally, as another embodiment, when the state signal indicates that the output voltage of the battery electric core 101 is greater than or equal to a voltage threshold and indicates that the output voltage of the apparatus 100 is greater than or equal to the voltage threshold, the logic control circuit 105 may turn off the voltage boost circuit 103 and control the switch device 102 to turn on the current path 106.

Figure 2:
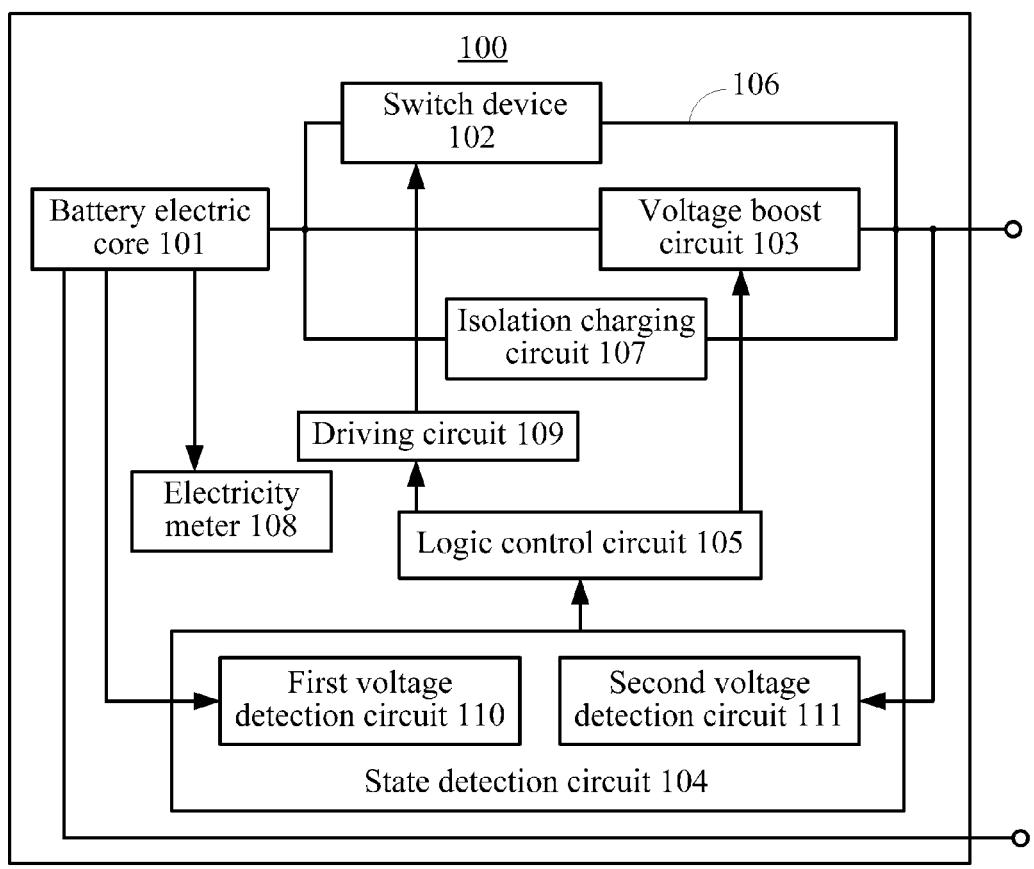
FIG. 2 is a schematic block diagram of a power supply apparatus according to an embodiment of the present invention.

Optionally, as another embodiment, as shown in FIG. 2, the apparatus 100 may further include a driving circuit 109. The driving circuit 109 may be connected to the switch device 102. The driving circuit 109 may adopt a field-effect transistor push-pull structure. The logic control circuit 105 controls the switch device 102 through the driving circuit 109. In this embodiment of the present invention, because the driving circuit adopts the field-effect transistor push-pull structure, the driving circuit has a high response speed and a strong driving capability.

Optionally, as another embodiment, as shown in FIG. 2, the apparatus 100 may further include an isolation charging circuit 107. The isolation charging circuit 107 may be connected in parallel to the current path 106 and the voltage boost circuit 103, and is configured to charge the battery electric core 101 and isolate the output voltage of the battery electric core 101 from the output voltage of the apparatus 100. The logic control circuit 105 may further control the isolation charging circuit 107 according to the state signal.

Optionally, as another embodiment, when the state signal indicates that the output voltage of the battery electric core 101 is smaller than a voltage threshold and indicates that the output voltage of the apparatus 100 is greater than or equal to the voltage threshold, the logic control circuit 105 may turn on the isolation charging circuit 107, turn off the voltage boost circuit 103, and control the switch device 102 to turn off the current path 106. The battery electric core 101 may be charged by turning on the isolation charging circuit 107. In addition, Because the isolation charging circuit 107 has an isolation function and the output voltage of the battery electric core 101 is smaller than the output voltage of the apparatus 100, in a process of charging the battery electric core 101, it can be ensured that the output voltage of the apparatus 100 is not pulled down by the output voltage of the battery electric core 101, so that normal work of the load of the apparatus 100 can be ensured.

Optionally, as another embodiment, the voltage boost circuit 103, the state detection circuit 104, the logic control circuit 105, and the isolation charging circuit 107 may be integrated in one chip. In addition, the voltage boost circuit 103, the state detection circuit 104, the logic control circuit 105, and the isolation charging circuit 107 may also not be integrated in one chip, which is not limited in this embodiment of the present invention.

Optionally, as another embodiment, the state detection circuit 104 may include a first voltage detection circuit 110 and a second voltage detection circuit 111.

The first voltage detection circuit 110 may be configured to detect the output voltage of the battery electric core 101 and compare the output voltage of the battery electric core 101 with a voltage threshold.

The second voltage detection circuit 111 may be configured to detect the output voltage of the apparatus 100 and compare the output voltage of the apparatus 100 with the voltage threshold.

Optionally, as another embodiment, the switch device 102 may include an MOSFET and a parasitic diode that is connected in parallel to the MOSFET.

Optionally, as another embodiment, as shown in FIG. 2, the apparatus 100 may further include an electricity meter 108, configured to detect the amount of electricity of the battery electric core 101.

Optionally, as another embodiment, the electricity meter 108, the voltage boost circuit 103, the state detection circuit 104, and the logic control circuit 105 may be integrated in one chip.

In addition, the electricity meter 108, the voltage boost circuit 103, the state detection circuit 104, the logic control circuit 105, and the isolation charging circuit 107 may also be integrated in one chip, which is not limited in this embodiment of the present invention.

In this embodiment of the present invention, when the battery electric core is in an abnormal charging state, the logic control circuit can control the switch device to turn off the current path, and when the voltage boost circuit is not required to work, the logic control circuit can control the switch device to turn on the current path. Therefore, charging protection for the battery electric core and a bypass function for the voltage boost circuit can be implemented through control that is performed on the switch device by the logic control circuit, without through multiple switch devices. Therefore, the number of switch devices can be reduced, so that additional impedance can be reduced and working efficiency can be improved.

In addition, because the number of switch devices can be reduced, space of a PCB can be saved, so that costs of a device and a single board can be lowered.

The embodiment of the present invention is described in detail in the following with reference to specific examples. It should be noted that the examples are used only to help persons skilled in the art have a better understanding of the embodiment of the present invention rather than to limit the scope of the embodiment of the present invention.

Figure 3:
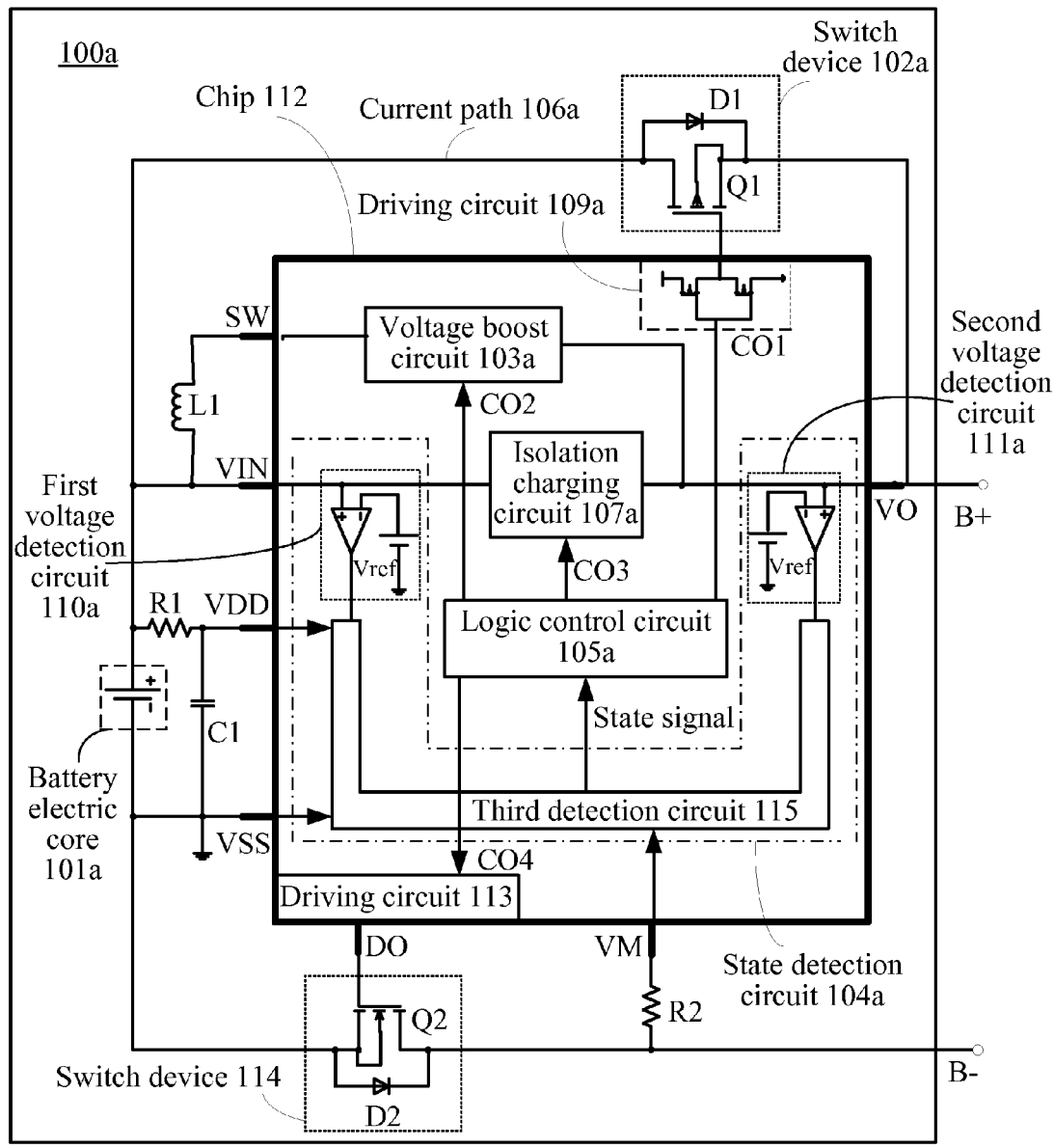
FIG. 3 is a schematic block diagram of an example of a power supply apparatus according to an embodiment of the present invention.

FIG. 3 is a schematic block diagram of an example of a power supply apparatus according to an embodiment of the present invention.

As shown in FIG. 3, an apparatus 100a may include a battery electric core 101a, a switch device 102a, a voltage boost circuit 103a, a state detection circuit 104a, a logic control circuit 105a, an isolation charging circuit 107a, a driving circuit 109a, and a driving circuit 113.

It should be noted that, in FIG. 3, the voltage boost circuit 103a, the state detection circuit 104a, the logic control circuit 105a, the isolation charging circuit 107a, the driving circuit 109a, and the driving circuit 113 may be integrated in a chip 112. However, in this embodiment of the present invention, the voltage boost circuit 103a, the state detection circuit 104a, the logic control circuit 105a, the isolation charging circuit 107a, the driving circuit 109a, and the driving circuit 113 may also not be integrated in one chip, which is not limited in this embodiment of the present invention.

The switch device 102a is connected in a current path 106a of the battery electric core 101a. The switch device 102a may include Q1 and D1, where Q1 may be an MOSFET, and D1 may be a parasitic diode.

Both the voltage boost circuit 103a and the isolation charging circuit 107a may be connected in parallel to the current path 106a. The voltage boost circuit 103a may be configured to boost an output voltage of the battery electric core 101a. The isolation charging circuit 107a may be configured to charge the battery electric core 101a and isolate a voltage at an output end VIN of the battery electric core 101a from a voltage at an output end VO of the apparatus 100a.

The state detection circuit 104a may be configured to detect a state of the battery electric core 101a and a state of the apparatus 100a. The state detection circuit 104a may include a first voltage detection circuit 110a, a second voltage detection circuit 111a, and a third detection circuit 115. For example, as shown in FIG. 3, the first voltage detection circuit 110a may detect the voltage at the output end VIN of the battery electric core 101a and compare the voltage at the output end VIN with a voltage threshold. The second voltage detection circuit 111a may detect the voltage at the output end VO of the apparatus 100a and compare the voltage at the output end VO with the voltage threshold. The third detection circuit 115 may detect an end VDD of a resistor R1 and an end VM of a resistor R2. The third detection circuit 115 may further generate a state signal according to a detection result of the third detection circuit 115, a detection result of the first voltage detection circuit 110a, and a detection result of the second voltage detection circuit 111a, and send the state signal to the logic control circuit 105a.

The logic control circuit 105a may receive the state signal from the state detection circuit 104a and may control the switch device 102a, the voltage boost circuit 103a, and the isolation charging circuit 107a according to the state signal. When the battery electric core 101a is in an abnormal charging state, the logic control circuit 105a may control the switch device 102a to turn off the current path 106a, so as to perform charging protection on the battery electric core 101a. When the voltage boost circuit 103a is not required to work, the logic control circuit 105a may control the switch device 102a to turn on the current path 106a, so as to bypass the voltage boost circuit 103a.

For example, as shown in FIG. 3, according to the state signal, the logic control circuit 105a may generate a first control signal CO1 to control the switch device 102a through the driving circuit 109a, may generate a second control signal CO2 to control the voltage boost circuit 103a, and may generate a third control signal CO3 to control the isolation charging circuit 107a.

Optionally, when the state signal indicates that the battery electric core 101a is in an over-voltage state or when the state signal indicates that the battery electric core 101a is in an over-current charging state, the logic control circuit 105a may generate a first control signal CO1 to control the switch device 102a to turn off the current path 106a, and generate a second control signal CO2 to turn off the voltage boost circuit 103a, and may further generate a third control signal CO3 to turn off the isolation charging circuit 107a. In this way, the protection for the battery electric core 101a can be implemented by turning off each current path.

Optionally, when the state signal indicates that the voltage at the output end VIN of the battery electric core 101a is smaller than a voltage threshold and indicates that the voltage at the output end VO of the apparatus 100a is smaller than the voltage threshold, the logic control circuit 105a may generate a first control signal CO1 to control the switch device 102a to turn off the current path 106a, and generate a second control signal CO2 to turn on the voltage boost circuit 103a, and may further generate a third control signal CO3 to turn off the isolation charging circuit 107a.

The voltage threshold may be preset according to a factor such as performance of the battery electric core, which is not limited in this embodiment of the present invention. For example, for a battery electric core of a mobile communication terminal, a voltage threshold may be set to a value ranging from 3.3 V to 3.5 V.

When the voltage at the output end VIN of the battery electric core 101a is smaller than the voltage threshold and the voltage at the output end VO of the apparatus 100a is smaller than the voltage threshold, it may indicate that the battery electric core 101a is in a low voltage range. When the battery electric core 101a is in the low voltage range, it may cause that the voltage at the output end VO of the apparatus 100a is reduced. In order to ensure normal work of a load, the voltage at the output end VIN of the battery electric core 101a may be boosted by turning on the voltage boost circuit 103a.

Optionally, when the state signal indicates that the voltage at the output end VIN of the battery electric core 101a is greater than or equal to a voltage threshold and indicates that the voltage at the output end VO of the apparatus 100a is greater than or equal to the voltage threshold, the logic control circuit 105a may generate a first control signal CO1 to control the switch device 102a to turn on the current path 106a, and generate a second control signal CO2 to turn off the voltage boost circuit 103a, and in addition, may further generate a third control signal CO3 to turn off the isolation charging circuit 107a.

When the voltage at the output end VIN of the battery electric core 101a is greater than or equal to the voltage threshold and the voltage at the output end VO of the apparatus 100a is greater than or equal to the voltage threshold, it may indicate that the battery electric core 101a is in a high voltage range. When the battery electric core 101a is in the high voltage range, the voltage at the output end VO of the apparatus 100a can ensure normal work of a load without boosting the output voltage of the battery electric core 101a. Therefore, the current path 106a may be turned on and the voltage boost circuit 103a may be turned off.

Optionally, when the state signal indicates that the voltage at the output end VIN of the battery electric core 101a is smaller than a voltage threshold and indicates that the voltage at the output end VO of the apparatus 100a is greater than or equal to the voltage threshold, the logic control circuit 105a may generate a third control signal CO3 to turn on the isolation charging circuit 107a, generate a first control signal CO1 to control the switch device 102a to turn off the current path 106a, and generate a second control signal CO2 to turn off the voltage boost circuit 103a.

Because the isolation charging circuit 107a has an isolation function and the output voltage of the battery electric core 101a is smaller than the output voltage of the apparatus 100a, in a process of charging the battery electric core 101a, it can be ensured that the output voltage of the apparatus 100a is not pulled down by the output voltage of the battery electric core 101a, so that normal work of the load of the apparatus 100a can be ensured.

An example of a logic truth table of a logic control module 150 is shown in Table 1.

TABLE 1

| Logic truth table of logic control module 150 | | | | | |
|---|---|---|---|---|---|
| State Signal | | | Control Signal | | |
| STA1 | STA2 | STA3 | CO1 | CO2 | CO3 |
| 1 | 1 | 0 | 1 | 0 | 0 |
| 0 | 0 | 0 | 0 | 1 | 0 |
| 0 | 1 | 0 | 0 | 0 | 1 |
| X | X | 1 | 0 | 0 | 0 |
| H | X | 0 | 0 | 0 | 0 |

In Table 1, a state signal may include a first state signal STA1, a second state signal STA2, and a third state signal STA3.

When STA1 is "1", it may indicate that the output voltage of the battery electric core 101a is greater than or equal to a voltage threshold, when STA1 is "0", it may indicate that the output voltage of the battery electric core 101a is smaller than the voltage threshold, when STA1 is "X", it may indicate that a control signal is irrelevant with STA1, and when STA1 is "H", it may indicate that the battery electric core 101a is in an over-voltage state.

When STA2 is "1", it may indicate that the output voltage of the apparatus 100a is greater than or equal to the voltage threshold, when STA2 is "0", it may indicate that the output voltage of the apparatus 100a is smaller than the voltage threshold, and when STA2 is "X", it may indicate that a control signal is irrelevant with STA2.

When STA3 is "1", it may indicate that the battery electric core 101a is in an over-current charging state, and when STA3 is "1", it may indicate that the battery electric core 101a is in a normal charging current state.

When CO1 is "1", it may indicate that the current path 106a is turned on, and when the CO1 is "0", it may indicate that the current path 106a is turned off.

When CO2 is "1", it may indicate that the voltage boost circuit 103a is turned on, and when CO2 is "0", it may indicate that the voltage boost circuit 103a is turned off.

When CO3 is "1", it may indicate that the isolation charging circuit 107a is turned on, and when CO3 is "0", it may indicate that the isolation charging circuit 107a is turned off.

In addition, the apparatus 100a may further include a switch device 114. The switch device 114 may include Q2 and D2, where Q2 may be an MOSFET, and D2 may be a parasitic diode.

The logic control circuit 105a may further control the switch device 114 to perform discharging protection on the battery electric core 101a.

For example, as shown in FIG. 3, the logic control circuit 105a may further generate a fourth control signal CO4 to control the switch device 114 through the driving circuit 113.

In this embodiment of the present invention, when the battery electric core is in an abnormal charging state, the logic control circuit can control the switch device to turn off the current path, and when the voltage boost circuit is not required to work, the logic control circuit can control the switch device to turn on the current path. Therefore, charging protection for the battery electric core and a bypass function for the voltage boost circuit can be implemented through control that is performed on the switch device by the logic control circuit, without through multiple switch devices. Therefore, the number of switch devices can be reduced, so that additional impedance can be reduced and working efficiency can be improved.

In addition, because the number of switch devices can be reduced, space of a PCB can be saved, so that costs of a device and a single board can be lowered.

FIG. 4 is a schematic block diagram of a user equipment according to an embodiment of the present invention. The user equipment (User Equipment, UE) 400 shown in FIG. 4 includes a processor 410 and an apparatus 100.

The apparatus 100 supplies power to the processor 410.

The apparatus 100 may include a battery electric core 101, a switch device 102, a voltage boost circuit 103, a state detection circuit 104, and a logic control circuit 105. The switch device 102 is connected in a current path 106 of the battery electric core 101. The voltage boost circuit 103 is connected in parallel to the current path 106, and is configured to boost an output voltage of the battery electric core 101. The state detection circuit 104 is configured to detect a state of the battery electric core 101 and a state of the apparatus 100, and generate a state signal, where the state signal is used to indicate the state of the battery electric core 101 and the state of the apparatus 100. The logic control circuit 105 is configured to receive the state signal from the state detection circuit 104, and control the switch device 102 and the voltage boost circuit 103 according to the state signal, when the battery electric core 101 is in an abnormal charging state, control the switch device 102 to turn off the current path 106, and when the voltage boost circuit 103 is not required to work, control the switch device 102 to turn on the current path 106.

Reference may be made to processes of the embodiments shown in FIG. 1 to FIG. 3 for other functions and operations of the apparatus 100, which are not described herein again in order to avoid repetition.

It should be understood that, in this embodiment of the present invention, the UE, also referred to as a mobile terminal (Mobile Terminal, MT) or a mobile user equipment, may be a mobile terminal, for example, a mobile phone (or referred to as a "cellular" phone) and a computer that has a mobile terminal, for example, may be a portable, pocket, or handheld mobile device, or a mobile device built in a computer or mounted in a vehicle, which is not limited in this embodiment of the present invention.

In this embodiment of the present invention, when the battery electric core is in an abnormal charging state, the logic control circuit can control the switch device to turn off the current path, and when the voltage boost circuit is not required to work, the logic control circuit can control the switch device to turn on the current path. Therefore, charging protection for the battery electric core and a bypass function for the voltage boost circuit can be implemented through control that is performed on the switch device by the logic control circuit, without through multiple switch devices. Therefore, the number of switch devices can be reduced, so that additional impedance can be reduced and working efficiency can be improved.

In addition, because the number of switch devices can be reduced, space of a PCB can be saved, so that a cost of the UE can be lowered.

FIG. 5 is a schematic flowchart of a power supply method according to an embodiment of the present invention.

510: A state detection circuit detects a state of a battery electric core and a state of a power supply apparatus, and generates a state signal, where the state signal is used to indicate the state of the battery electric core and the state of the apparatus.

520: A logic control circuit receives the state signal from the state detection circuit, and controls a switch device and a voltage boost circuit according to the state signal, when the battery electric core is in an abnormal charging state, controls the switch device to turn off a current path of the battery electric core, and when the voltage boost circuit is not required to work, controls the switch device to turn on the current path.

The apparatus includes the state detection circuit, the battery electric core, the voltage boost circuit, the switch device, and the logic control circuit. The switch device is connected in the current path. The voltage boost circuit is connected in parallel to the current path. The voltage boost circuit is configured to boost an output voltage of the battery electric core.

In this embodiment of the present invention, when the battery electric core is in an abnormal charging state, the logic control circuit can control the switch device to turn off the current path, and when the voltage boost circuit is not required to work, the logic control circuit can control the switch device to turn on the current path. Therefore, charging protection for the battery electric core and a bypass function for the voltage boost circuit can be implemented through control that is performed on the switch device by the logic control circuit, without through multiple switch devices. Therefore, the number of switch devices can be reduced, so that additional impedance can be reduced and working efficiency can be improved.

In addition, because the number of switch devices can be reduced, space of a PCB can be saved, so that costs of a device and a single board can be lowered.

Optionally, as an embodiment, when the state signal indicates that the battery electric core is in an over-voltage state or when the state signal indicates that the battery electric core is in an over-current charging state, the logic control circuit may turn off the voltage boost circuit and control the switch device to turn off the current path.

Optionally, as another embodiment, when the state signal indicates that the output voltage of the battery electric core is greater than or equal to a voltage threshold and indicates that an output voltage of the apparatus is greater than or equal to the voltage threshold, the logic control circuit may turn off the voltage boost circuit and control the switch device to turn on the current path.

Optionally, as another embodiment, when the state signal indicates that the output voltage of the battery electric core is smaller than a voltage threshold and indicates that the output voltage of the apparatus is smaller than the voltage threshold, the logic control circuit may turn on the voltage boost circuit and control the switch device to turn off the current path.

Optionally, as another embodiment, when the state signal indicates that the output voltage of the battery electric core is smaller than a voltage threshold and indicates that the output voltage of the apparatus is greater than or equal to the voltage threshold, the logic control circuit may turn on an isolation charging circuit, turn off the voltage boost circuit, and control the switch device to turn off the current path, where the isolation charging circuit is configured to charge the battery electric core and isolate the output voltage of the battery electric core from the output voltage of the apparatus.

Optionally, as another embodiment, an example of a logic truth table of a logic control module is shown in Table 1.

Figure 6:
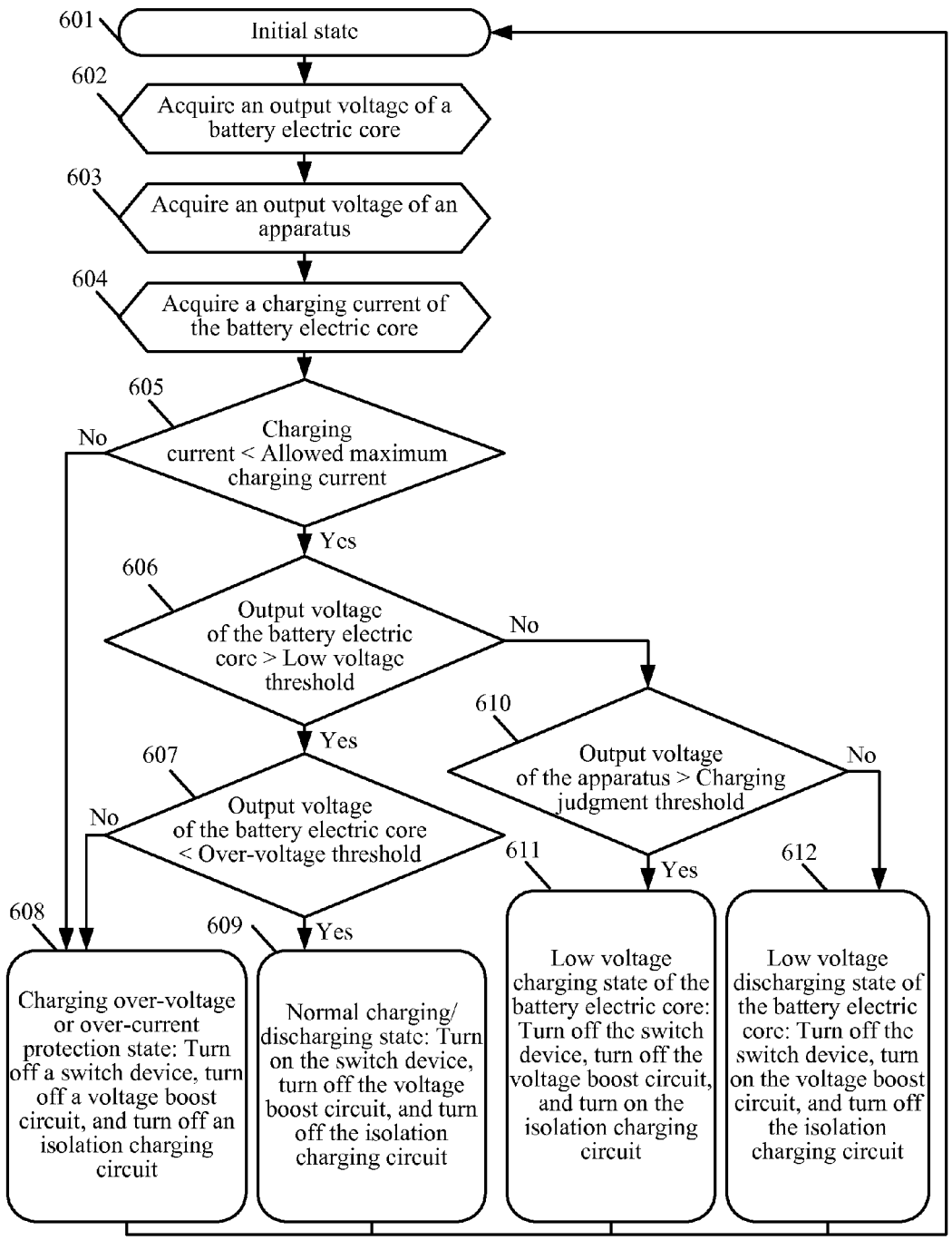
FIG. 6 is a schematic flowchart of a process of a power supply method according to an embodiment of the present invention.

FIG. 6 is a schematic flowchart of a process of a power supply method according to an embodiment of the present invention.

601: An apparatus is in an initial state.

602: Acquire an output voltage of a battery electric core.

For example, a first voltage detection circuit may detect the output voltage of the battery electric core.

603: Acquire an output voltage of the apparatus.

For example, a second voltage detection circuit may detect the output voltage of the apparatus.

604: Acquire a charging current of the battery electric core.

605: Determine whether the charging current acquired in step 604 is smaller than an allowed maximum charging current.

If the charging current is smaller than the allowed maximum charging current, it may indicate that the battery electric core is in a normal charging state, and then proceed to step 606.

If the charging current is greater than or equal to the allowed maximum charging current, it may indicate that the battery electric core is in an abnormal charging state, and then proceed to step 608.

In step 608, a switch device, a voltage boost circuit, and an isolation charging circuit may be turned off, so as to protect the battery electric core.

606: If the charging current is smaller than the allowed maximum charging current, determine whether the output voltage of the battery electric core is greater than a low voltage threshold.

If the output voltage of the battery electric core is greater than the low voltage threshold, it may indicate that the battery electric core is in a normal voltage state, and then proceed to step 607.

If the output voltage of the battery electric core is smaller than or equal to the low voltage threshold, it may indicate that the battery electric core is in a low voltage state, and then proceed to step 610.

607: If the output voltage of the battery electric core is greater than the low voltage threshold, determine whether the output voltage of the battery electric core is smaller than an over-voltage threshold.

If the output voltage of the battery electric core is greater than or equal to the over-voltage threshold, it may indicate that the battery electric core is in an over-voltage state, and then proceed to step 608, where the switch device, the voltage boost circuit, and the isolation charging circuit are turned off, so as to protect the battery electric core.

If the output voltage of the battery electric core is smaller than the over-voltage threshold, proceed to step 609.

In step 609, because the battery electric core is in a normal charging/discharging state, that is, the battery electric core is in a normal voltage state and the output voltage of the battery electric core does not need to be boosted, a current path where the switch device is located may be turned on by turning on the switch device, and the voltage boost circuit and the isolation charging circuit may be turned off, so as to bypass the voltage boost circuit.

610: If the output voltage of the battery electric core is smaller than or equal to the low voltage threshold, determine whether the output voltage of the apparatus is greater than a charging judgment threshold.

If the output voltage of the battery electric core is smaller than or equal to the low voltage threshold and the output voltage of the apparatus is greater than the charging judgment threshold, proceed to step 611.

In step 611, the battery electric core needs to enter and remain in a low voltage charging state, the switch device and the voltage boost circuit are turned off, and the isolation charging circuit is turned on.

If the output voltage of the battery electric core is smaller than or equal to the low voltage threshold and the output voltage of the apparatus is smaller than or equal to the charging judgment threshold, proceed to step 612.

In step 612, the battery electric core is in a low voltage discharging state; and in order to ensure that the output voltage of the apparatus can enable a load to work normally, the output voltage of the battery electric core needs to be boosted, and then the voltage boost circuit may be turned on and the switch device and the isolation charging circuit may be turned off.

In this embodiment of the present invention, when the battery electric core is in an abnormal charging state, the logic control circuit can control the switch device to turn off the current path, and when the voltage boost circuit is not required to work, the logic control circuit can control the switch device to turn on the current path. Therefore, charging protection for the battery electric core and a bypass function for the voltage boost circuit can be implemented through control that is performed on the switch device by the logic control circuit, without through multiple switch devices. Therefore, the number of switch devices can be reduced, so that additional impedance can be reduced and working efficiency can be improved.

Persons of ordinary skill in the art should be aware that, in combination with the examples described in the embodiments disclosed in this specification, units and algorithm steps can be implemented by electronic hardware, or a combination of computer software and electronic hardware. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus and unit, reference may be made to the corresponding process in the method embodiments, which is not described herein again.

In the embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections are implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions in the embodiments.

In addition, functional units in the embodiments of the present invention may be integrated into one processing unit, or each of the units may exist alone physically, or two or more units are integrated into one unit.

When the functions are implemented in the form of a software functional unit and sold or used as a separate product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to execute all or part of the steps of the method described in the embodiment of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A power supply apparatus, comprising:
a battery electric core, a switch device, a voltage boost circuit, a state detection circuit, and a logic control circuit, wherein:
the switch device is connected in a current path of the battery electric core;
the voltage boost circuit is connected in parallel to the current path, and is configured to boost an output voltage of the battery electric core;
the state detection circuit is configured to:
detect a state of the battery electric core and a state of the apparatus, and
generate a state signal, wherein the state signal is used to indicate the state of the battery electric core and the state of the apparatus; and
the logic control circuit is configured to:
receive the state signal from the state detection circuit, and
control the switch device and the voltage boost circuit according to the state signal, such that:
when the battery electric core is in an abnormal charging state, control the switch device to turn off the current path, and
when the voltage boost circuit is not required to work, control the switch device to turn on the current path.

2. The apparatus according to claim 1, wherein the logic control circuit is configured to, when the state signal indicates that the battery electric core is in an over-voltage state or when the state signal indicates that the battery electric core is in an over-current charging state, turn off the voltage boost circuit and control the switch device to turn off the current path.

3. The apparatus according to claim 1, wherein the logic control circuit is configured to, when the state signal indicates that the output voltage of the battery electric core is smaller than a voltage threshold and indicates that an output voltage of the apparatus is smaller than the voltage threshold, turn on the voltage boost circuit and control the switch device to turn off the current path.

4. The apparatus according to claim 1, wherein the logic control circuit is configured to, when the state signal indicates that the output voltage of the battery electric core is greater than or equal to a voltage threshold and indicates that an output voltage of the apparatus is greater than or equal to the voltage threshold, turn off the voltage boost circuit and control the switch device to turn on the current path.

5. The apparatus according to claim 1, further comprising:
a driving circuit, connected to the switch device, wherein the driving circuit adopts a field-effect transistor push-pull structure, and wherein
the logic control circuit is specifically configured to control the switch device through the driving circuit.

6. The apparatus according to claim 1, further comprising an isolation charging circuit connected in parallel to the current path and the voltage boost circuit, and wherein the isolation charging circuit is configured to charge the battery electric core and isolate the output voltage of the battery electric core from the output voltage of the apparatus, and
wherein the logic control circuit is further configured to control the isolation charging circuit according to the state signal.

7. The apparatus according to claim 6, wherein the logic control circuit is configured to, when the state signal indicates that the output voltage of the battery electric core is smaller than a voltage threshold and indicates that the output voltage of the apparatus is greater than or equal to the voltage threshold, turn on the isolation charging circuit, turn off the voltage boost circuit, and control the switch device to turn off the current path.

8. The apparatus according to claim 6, wherein the voltage boost circuit, the state detection circuit, the logic control circuit, and the isolation charging circuit are integrated in one chip.

9. The apparatus according to claim 1, wherein the state detection circuit comprises a first voltage detection circuit and a second voltage detection circuit,
wherein the first voltage detection circuit is configured to detect the output voltage of the battery electric core and compare the output voltage of the battery electric core with a voltage threshold; and
the second voltage detection circuit is configured to detect the output voltage of the apparatus and compare the output voltage of the apparatus with the voltage threshold.

10. A user equipment, comprising:
a processor; and
the power supply apparatus according to claim 1,
wherein the apparatus is configured to supply power to the processor.

11. A power supply method, comprising:
detecting, by a state detection circuit, a state of a battery electric core and a state of a power supply apparatus, and generating a state signal based on the detecting, wherein the state signal indicates the state of the battery electric core and the state of the apparatus; and
receiving, by a logic control circuit, the state signal from the state detection circuit, and controlling a switch device and a voltage boost circuit according to the state signal, such that:
when the battery electric core is in an abnormal charging state, controlling the switch device to turn off a current path of the battery electric core, and
when the voltage boost circuit is not required to work, controlling the switch device to turn on the current path,
wherein the apparatus comprises the state detection circuit, the battery electric core, the voltage boost circuit, the switch device, and the logic control circuit, and
wherein the switch device is connected in the current path, the voltage boost circuit is connected in parallel to the current path, and the voltage boost circuit is configured to boost an output voltage of the battery electric core.

12. The method according to claim 11, wherein when the battery electric core is in an abnormal charging state, the controlling the switch device to turn off the current path of the battery electric core comprises:
when the state signal indicates that the battery electric core is in an over-voltage state, turning off, by the logic control circuit, the voltage boost circuit, and controlling the switch device to turn off the current path; and
when the state signal indicates that the battery electric core is in an over-current charging state, turning off, by the logic control circuit, the voltage boost circuit, and controlling the switch device to turn off the current path.

13. The method according to claim 11, wherein when the voltage boost circuit is not required to work, the controlling the switch device to turn on the current path comprises:
when the state signal indicates that the output voltage of the battery electric core is greater than or equal to a voltage threshold and indicates that an output voltage of the apparatus is greater than or equal to the voltage threshold, turning off, by the logic control circuit, the voltage boost circuit, and controlling the switch device to turn on the current path.

14. The method according to claim 11, further comprising: when the state signal indicates that the output voltage of the battery electric core is smaller than a voltage threshold and indicates that an output voltage of the apparatus is smaller than the voltage threshold, turning on, by the logic control circuit, the voltage boost circuit, and controlling the switch device to turn off the current path.

15. The method according to claim 11, further comprising: when the state signal indicates that the output voltage of the battery electric core is smaller than a voltage threshold and indicates that the output voltage of the apparatus is greater than or equal to the voltage threshold, turning on, by the logic control circuit, an isolation charging circuit, turning off the voltage boost circuit, and controlling the switch device to turn off the current path, wherein the isolation charging circuit is configured to charge the battery electric core and isolate the output voltage of the battery electric core from the output voltage of the apparatus.

16. The method according to claim 11, wherein a logic truth table of the logic control circuit is:

| State Signal | | | Control Signal | | |
|---|---|---|---|---|---|
| STA1 | STA2 | STA3 | CO1 | CO2 | CO3 |
| 1 | 1 | 0 | 1 | 0 | 0 |
| 0 | 0 | 0 | 0 | 1 | 0 |
| 0 | 1 | 0 | 0 | 0 | 1 |
| X | X | 1 | 0 | 0 | 0 |
| H | X | 0 | 0 | 0 | 0 | wherein when STA1 is "1", it indicates that the output voltage of the battery electric core is greater than or equal to a voltage threshold, when STA1 is "0", it indicates that the output voltage of the battery electric core is smaller than the voltage threshold, when STA1 is "X", it indicates that a control signal is irrelevant with STA1, and when STA1 is "H", it indicates that the battery electric core is in an over-voltage state;

when STA2 is "1", it indicates that the output voltage of the apparatus is greater than or equal to the voltage threshold, when STA2 is "0", it may indicate that the output voltage of the apparatus is smaller than the voltage threshold, and when STA2 is "X", it indicates that a control signal is irrelevant with STA2;

when STA3 is "1", it indicates that the battery electric core is in an over-current charging state, and when STA3 is "1", it indicates that the battery electric core is in a normal charging current state;

when CO1 is "1", it indicates that the switch device is controlled to turn on the current path, and when CO1 is "0", it indicates that the switch device is controlled to turn off the current path;

when CO2 is "1", it indicates that the voltage boost circuit is turned on, and when CO2 is "0", it indicates that the voltage boost circuit is turned off; and when CO3 is "1", it indicates that the isolation charging circuit is turned on, and when CO3 is "0", it indicates that the isolation charging circuit is turned off.

* * * * *